United States Patent [19]

Shinzawa

[11] Patent Number: 5,067,457

[45] Date of Patent: Nov. 26, 1991

[54] SWIRL CHAMBER TYPE DIESEL ENGINE

[75] Inventor: Motohiro Shinzawa, Yokosuka, Japan

[73] Assignee: Nissan Motor Company, Ltd., Yokohama, Japan

[21] Appl. No.: 505,072

[22] Filed: Apr. 5, 1990

[30] Foreign Application Priority Data

Apr. 7, 1989 [JP] Japan .................................. 1-88585

[51] Int. Cl.$^5$ .............................................. F02B 19/08
[52] U.S. Cl. ..................................... 123/269; 123/262
[58] Field of Search ......................... 123/269, 262, 290

[56] References Cited

U.S. PATENT DOCUMENTS

| | | | |
|---|---|---|---|
| 4,662,330 | 5/1987 | Shioyama et al. | 123/269 |
| 4,785,776 | 11/1988 | Tokura et al. | 123/269 |
| 4,881,501 | 11/1989 | Shinzawa et al. | 123/279 |

FOREIGN PATENT DOCUMENTS

| | | |
|---|---|---|
| 50-138403 | 5/1949 | Japan . |
| 57-78724 | 10/1955 | Japan . |
| 54-59512 | 5/1979 | Japan . |

*Primary Examiner*—Andrew M. Dolinar
*Attorney, Agent, or Firm*—Lowe, Price, LeBlanc & Becker

[57] ABSTRACT

A piston crown is formed with a cavity including a first flame deflecting member which is located amid three flame dispersion zones and which splits burning gases ejected from a transfer port into a first dispersion zone, while the piston is proximate its TDC position, into two flows. The arrangement additionally induces the two flows to assume two essentially symmetrical swirling patterns in second and third dispersion zones. After the piston has descended by a predetermined amount, the burning gases are supplied directly into the second and third zones. Important design considerations which influence the efficiency with which the air in the main combustion chamber include the angle at which the gases are directed toward the piston crown, the location of the first flame splitting member with respect to the site where the flame initially impinges on the first dispersion zone, the angle at which the flame is split and directed toward the second and third zones, the areas of the first, second and zones in which the swirling air patterns are produced and the velocity at which the burning gases flow into the second and third zones.

3 Claims, 6 Drawing Sheets

SWIRL CHAMBER TYPE DIESEL ENGINE

RELATED APPLICATIONS

U.S. Pat. No. 4,785,776 issued on Nov. 22, 1988 in the name of Tokura et al.

U.S. Pat. No. 4,881,501 issued on Nov. 21, 1989 in the name of Shinzawa et al.

BACKGROUND OF THE INVENTION

1. Field of the Invention

The present invention relates generally to a swirl type diesel engine and more specifically to such a diesel engine wherein the crown of the piston is formed with a two stage flame splitting/swirl inducing arrangement which improves dispersion and mixing of flame which is ejected from the swirl chamber.

2. Description of the Prior Art

FIG. 1 shows a so called "clover leaf" type flame dispersing cavity or recess arrangement 1 which is used in combination with a swirl or prechamber type diesel engine of the nature disclosed in JP-A-54-59512, JM-A-50-138403 and JM-A-57-78724.

With this type of engine, in order to lower the peak combustion temperature in the swirl chamber 2 and thus reduce the amount of NOx produced, a fraction of the fuel which is injected thereinto is released into the main combustion chamber prior spontaneous combustion of the main air-fuel charge in the swirl chamber.

However, in the absence of any strong turbulence or other mixing influence, most of the fuel which is permitted to escape into the main combustion chamber via a transfer passage 3 tends to either remain in, or close to the trench portion 4 of the cavity. As the cavity 1 exerts only a relatively weak dispersive influence on the flame which is ejected into the trench 4, it tends to flow up and over the rounded nose portion 5 of the clover leaf type dispersion recess located opposite the trench. This induces the situation wherein the fuel droplets in the trench tend to be entrained in a flame plume FP having a shape essentially as illustrated in broken line.

Under these conditions, the fuel which is released into the main combustion chamber tends to be carried by the initial flame ejection into a relatively cool section thereof wherein quenching of the flame is apt occur.

Accordingly, the relatively rich flame and the entrained fuel (particularly the latter) are not mixed effectively with the air which is available in the main combustion chamber and neither tend to undergo sufficiently rapid nor complete combustion to enable good engine output and low noxious emissions.

As a result of this problem, during low load engine operation high HC emissions result while under higher loads smoke formation tends to exceed acceptable limits.

SUMMARY OF THE INVENTION

It is an object of the present invention to provide an arrangement which promotes improved spreading of the flame which ejects via the transfer port from the swirl chamber and mixing with the air and/or fuel which is present in the main combustion chamber in a manner which promotes more efficient combustion and thus reduces smoke and HC emissions.

In brief, the above object is achieved by an arrangment wherein a piston crown is formed with a cavity including a first flame deflecting member which is located amid three flame dispersion zones and which splits the burning gases which are ejected from a transfer port into the first dispersion zone while the piston is proximate its TDC position, into two flows. The arrangement additionally includes an arrangement which induces the two flows to assume two essentially symmetrical swirling patterns in the second and third dispersion zones. After the piston has descended by a predetermined amount, the burning gases are supplied directly into the second and third zones.

Important design considerations which influence the efficiency with which the air in the main combustion chamber is used come in: the angle at which the gases are directed toward the piston crown; the location of the first flame splitting member with respect to the site where the flame initially impinges in the first dispersion zone; the angle at which the flame is split and directed toward the second and third zones; the areas of the first zone into which the flame is ejected and of the zones in which the swirling air patterns are produced; and the velocity at which gases flow into the second and third zones.

More specifically, a first aspect of the present invention is deemed to comprise a swirl chamber type diesel engine wherein a main combustion chamber is fluidly communicated with a swirl chamber by way of a transfer port, which features: a piston, the piston having an essentially flat crown portion and an imaginary line of symmetry which divides the circular crown into first and second semi-circular halves, the transfer port being arranged so that an extrapolation thereof falls on the line; means defining first and second essentially circular dispersion recesses on either side of the line and in the first and second semi-circular halves, the essentially circular dispersion recesses having having first and second centers respectively; means defining an island-like projection, the island-like projection being located on the line; a V-shaped portion defined on the island-line projection, the V-shaped portion being oriented toward the periphery of the piston, an apex of the V-shaped portion being disposed on the line and arranged so that it is located on the inboard extremum of the extrapolation of the transfer port when the piston assumes a first predetermined position wherein the crank angle is in the range of 17°–21° ATDC and so that it is located on the outboard extremum of the extrapolation when the piston has descended from the first predetermined position to a second predetermined position wherein the crank angle is in a crank angle range of 33°–35° ATDC, the inboard and outboard extremums intersecting the crown of the piston at a predetermined angle $\phi$, the inboard extremum intersecting the crown of the piston at a point P when the piston assumes its TDC position, the point being located with respect to the first and second essentially circular recesses so that an angle is defined between straight lines joining the point to the first and second centers, respectively, does not differ from a specified angle by more than ±2°.

A second aspect of the present invention is deemed to comprise an internal combustion engine which features: a piston reciprocatively disposed in a bore to define a variable volume combustion chamber; and a swirl chamber, the swirl chamber being fluidly communicated with the combustion chamber by a transfer passage, the piston comprising: an essentially flat crown; a shaped cavity formed in the crown, the cavity defining first and second shape opposed wall portions; a flame deflecting projection which extends up from the floor of the cavity, the flame deflecting projection being arranged to be in the path of the burning gases which eject from the transfer passage during an expansion stroke of the piston and when the piston is close to its TDC position, the flame deflecting projection being arranged to split the burning gases into first and second flows; the first and second shaped walls and the flame deflecting projection defining a first flame dispersion zone into which the burning gases from the swirl chamber are initially ejected, and second and third essentially circular symmetrically arranged dispersion zones, the first flame dispersing portion being arranged such that, when the piston is at its TDC position, essentially all of the burning gases which are ejected from the swirl chamber are received therein and subsequently split into two rotating swirl patterns in the second and third zones, the first shaped wall being formed with two symmetrically arranged guide portions which extend toward the flame deflecting projection and which deflect the gases which flow from the first zone into the second and third zones, a ratio defined as the width of the flame deflecting projection taken in the direction of the guide portions divided by the distance between the guide portions being selected to be in the range of 27.5–31.5%.

A third aspect of the present invention comes in the form of an internal combustion engine which features: a piston reciprocatively disposed in a bore to define a variable volume combustion chamber; and a swirl chamber, the swirl chamber being fluidly communicated with the combustion chamber by a transfer passage, the piston comprising: means defining a first flame dispersion recess in the crown of the piston into which the burning gases from the swirl chamber are initially ejected; means defining and second and third essentially circular dispersion recesses in the crown of the piston, the second and third dispersion recesses being contiguous with one another and symmetrically arranged with and contiguous with the first flame dispersing recess, the first flame dispersing recess being arranged so that when the piston is at a TDC position, essentially of the burning gases which are ejected from the swirl chamber are received therein and split into two flows which flow into the second and third flame dispersing recesses and form circular swirl patterns therein; a island-like projection which is formed at a location between the first, second and third dispersion recesses, the island-like projection defining means against which the gases ejected into the first flame dispersing recess impinge and are split into the two flows and guided into the second and third dispersion recesses, the island-like projection being arranged with respect to the transfer passage so that the burning gases from the swirl chamber begin to impinge directly thereon after the piston has descended from its TDC position to one corresponding to a crank angle range of 17°–21° ATDC, thereby defining a stage wherein the flame splitting action begins to attenuate, and undergoes no splitting action after the piston has descended by a second predetermined amount which falls in a crank angle range of 33°–35° ATDC.

DETAILED DESCRIPTION OF THE PREFERRED EMBODIMENTS

Figure 1:
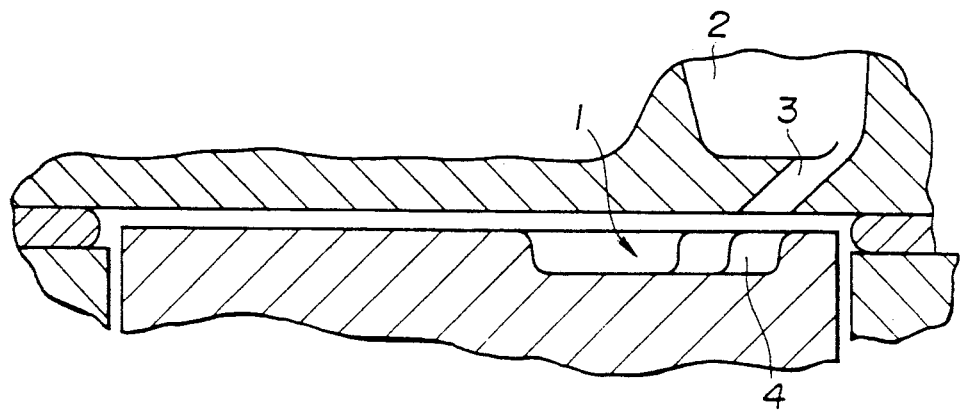
FIGS. 1 and 2 show the prior art arrangement discussed in the opening paragraphs of the instant disclosure.
Figure 2:
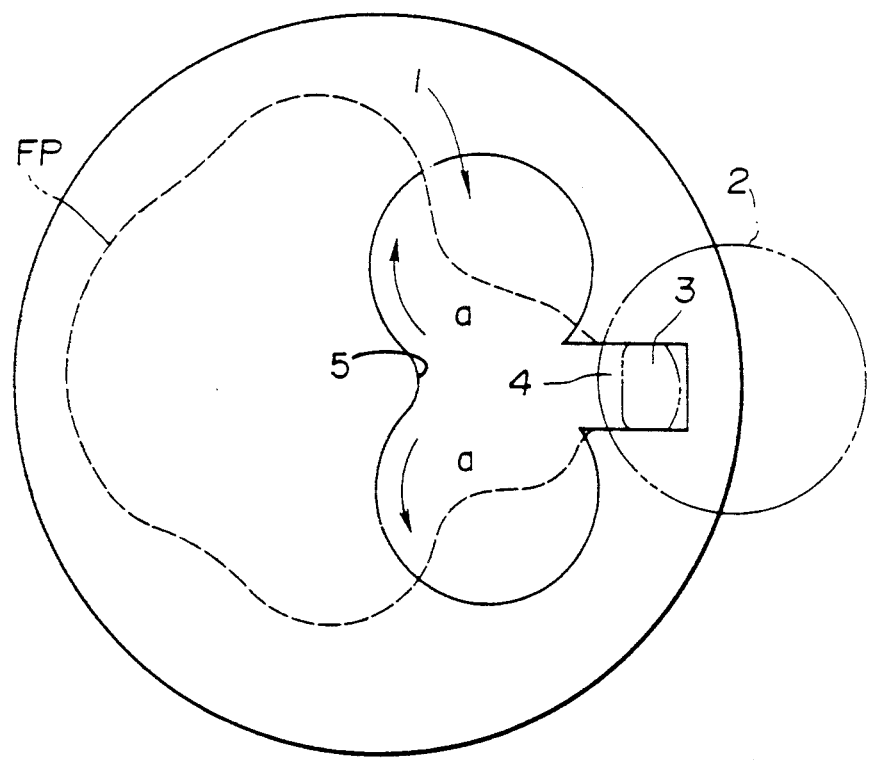

FIG. 1 shows a swirl chamber type diesel engine which embodies the present invention. In this arrangement the piston 100 is formed with a flame dispersing cavity in the crown thereof. The cavity is defined between two opposite shaped walls 101 and 102 and is relatively shallow in order to prevent loss of compression.

To facilitate description of the configuration and arrangement of the various portions of the cavity the use of a symmetry line A which extends along a diameter of the piston and which passes through the center of the crown.

Portions of the first wall 101 are formed in a manner to define two essentially inwardly directed nose-like guide portions 101A and 101B. These portions 101A and 101B define a first flame dispersion area or zone within the cavity. A wall portion 101C which extends between the two guide portions is arranged to have a curvature which tends to parallel the outer periphery of the piston. In this instance the first flame dispersion zone has what shall be referred to as a bay-like configuration.

Curved wall portions 101D and 101E of the first wall 101 and portions 102A and 102B of the second wall 102 are arranged to define therebetween second and third dispersion areas or zones which have essentially circular shapes and which both partially overlap one another and the first dispersion zone. These second and third zones are arranged symmetrically with respect to line A.

A single island-like deflection portion 108 is located amid the first, second and third flame dispersion zones. This element is arranged to project up from the floor of the cavity in the mouth of the bay-like first flame dispersion zone, on the line A at a location between the center of the piston the wall portion 101C.

The island 108 (as it will be referred to hereinafter) is arranged with respect to the transfer passage 106 which fluidly communicates the swirl chamber 107 with the main combustion chamber in a manner to be located in the path of the flame which ejects from the transfer passage while the piston is close to its TDC position. Further comment concerning this feature will be given hereinlater.

The side of the island 108 which faces the wall portion 101C is formed with angled walls which define a first V-shaped flame splitting portion. The angle defined by these walls will discussed in more detail hereinlater.

A second flame splitting portion is defined by a V-shaped nose-like portion 102C which forms part of the second wall 102. This portion 102C projects into the cavity in a manner which tends to separate the second and third circular dispersion zones. The sides of this nose are arranged to define a second angle. In this instance the first angle is preferably larger than the second one.

It will be noted that the second and third dispersion zones are open and such as to extend to the very perimeter of the piston 100, in the manner illustrated.

For disclosure relating to this type of dispersion arrangement wherein the petals of the clover leaf have portions which are open in the above mentioned manner, reference may be had to U.S. Pat. No. 4,662,330 issued on May 5, 1987 to Shioyama et al.

In general, the operation of the above described arrangement is such that when the piston is close to its TDC postion, the flame (burning gases) which initially ejects from the transfer passage following spontaneous combustion of the air-fuel charge in the swirl chamber 107, impinges on the first flame dispersion zone. As a result, the gases firstly tends to flow outwardly in the manner indicated by the initial portions of the arrows "b". After encountering the nose-like guide portions 101A and 101B the gases tends to curl back toward the island and proceeds in the direction of the second wall. Due to the shape of the second wall 102, two contra rotating swirl patterns are established in the second and third dispersion zones in the manner depicted.

Subsequently, as the piston descend, the location where the gases tend to impinge on the piston crown shifts toward the center thereof. Thus, following a given amount of descent, the gases pass over the top of the island 108 and impinges on the overlapping portions of the second and third dispersion zones. Under these conditions the effect of the second flame splitting portion 102C induces flows of the nature indicted by arrows "c".

This dual stage flame splitting action produces an extensive and well developed flame plume FP of the nature depicted by the chain line. The swirling and various changes in gas flow direction induce and promote mixing with the air and/or fuel droplets which are present in the main combustion chamber.

In accordance with the present invention it is preferred that the upper corner of the apex defined by the first V-shaped flame splitting portion defined on the island 108 is such as to be intersected by the inboard extremum I/E of an extrapolation of the transfer port 106 when the piston assumes a position within a crank angle range of ATDC 17°-21° and to intersect the outboard extremum O/E when the piston has descended to a position which falls in the crank angle range of 33°-35°. The angle at which the extrapolation intersects the crown of the piston is arranged to be $\phi$.

When the piston assumes its TDC position, the extremum I/E is arranged to intersect the first flame dispersion zone at point P. This point is located on line A and with respect to the centers Q, Q of the circular second and third dispersion zones in a manner which defines an angle $\alpha$. In this instance the angle $(\alpha/2)°$ which is defined on each side of the line A, can have a tolerance of ±2°.

The timing with which the splitting occurs and the angle $\alpha$ are critical to achieving the desired air usage efficiency and combustion characteristics.

In the event that the value of $\phi$ is small the splitting action by the island 108 is short lived and vice versa. In the event that the flame flow into the first flame dispersion zone terminates quickly, the efficiency with which the flame is mixed with the air in the main combustion chamber is reduced. Conversely, if the flame is allowed to impinge on the first flame dispersion zone for an excessively long period, the flow into the second and third dispersion zones is delayed to the point wherein an adequate supply of gas thereinto is not achieved. This results in the air which is available therein not being efficiently used.

Figure 5:
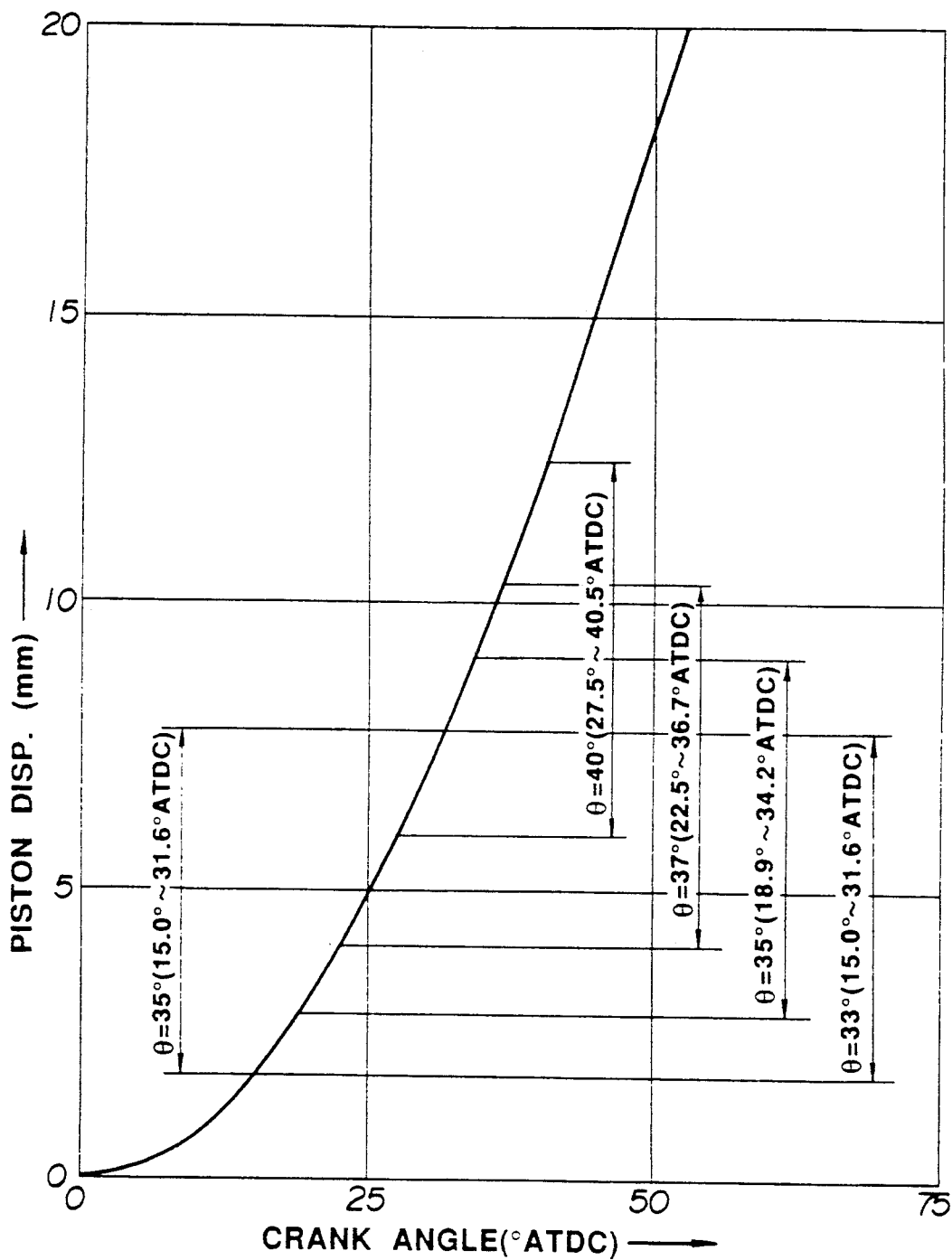
FIG. 5 is a graph which shows in terms of piston displacement and crank angle, the timing with which the leading and trailing (inboard, outboard) extremum of the transfer port extrapolation pass over an apex a V-shaped portion formed on an island-like projection which is arranged in the path of the flame as it ejects from the swirl chamber.

FIG. 5 is a graph which is recorded in terms of piston displacement and crank angle and which shows the effect of $\phi$ on the timing which the first splitting begins to attenuate to the time it finishes. In this figure data for five different values of $\phi$ are given.

In accordance with the present invention it is preferred that the angle at which the extrapolation intersects the crown of the piston $\phi = 35°$ which is accompanied by range of (15.0°-31.6° ATDC) over which the flame splitting begins to attenuate to the time it terminates.

It should be noted the angle at which the flame is split by the island 108 is important. That is to say, in the event that the splitting angle is too small, the amount of flow into circular second and third dispersion zones becomes excessive for the amount of air which is available therein and vice versa.

Figure 3:
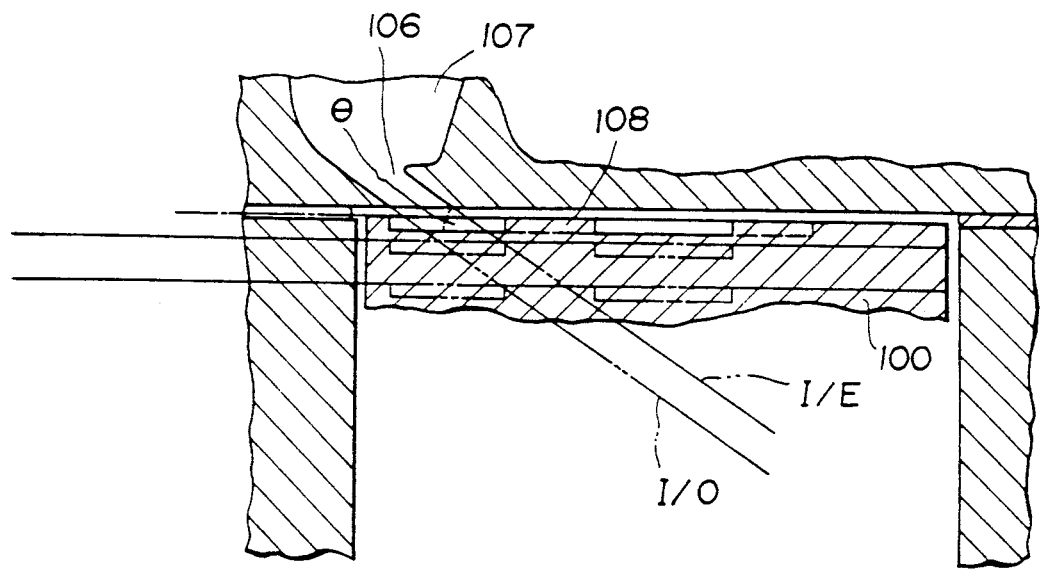
FIG. 3 is a sectional elevation showing a first embodiment of the present invention.
Figure 4:
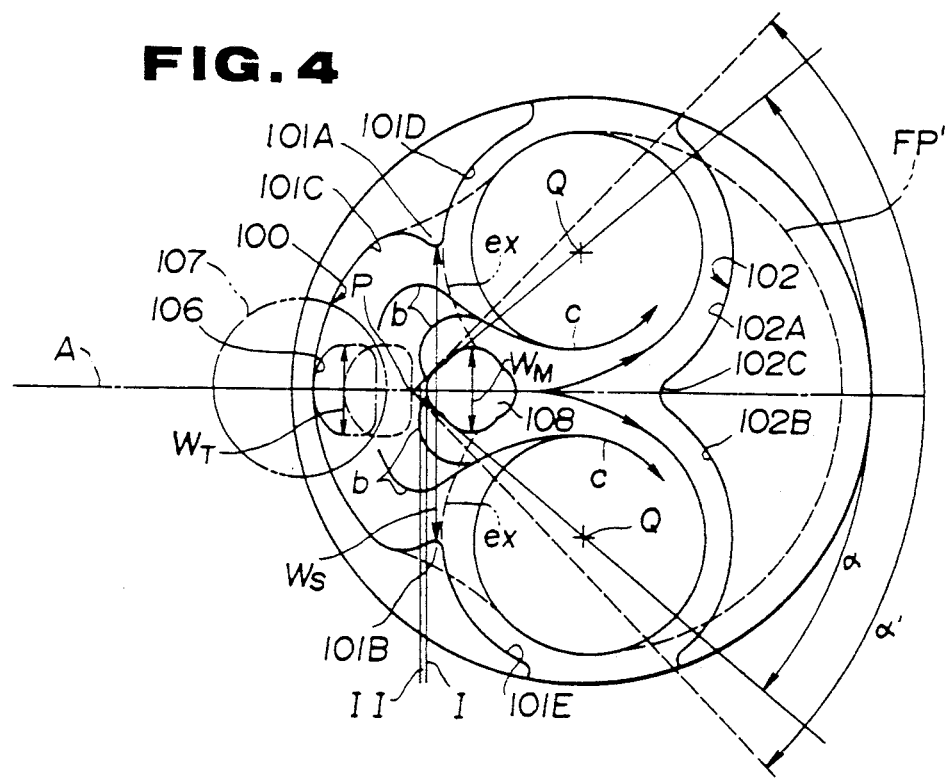
FIG. 4 is a plan view showing the crown of the piston of FIG. 3.
Figure 8:
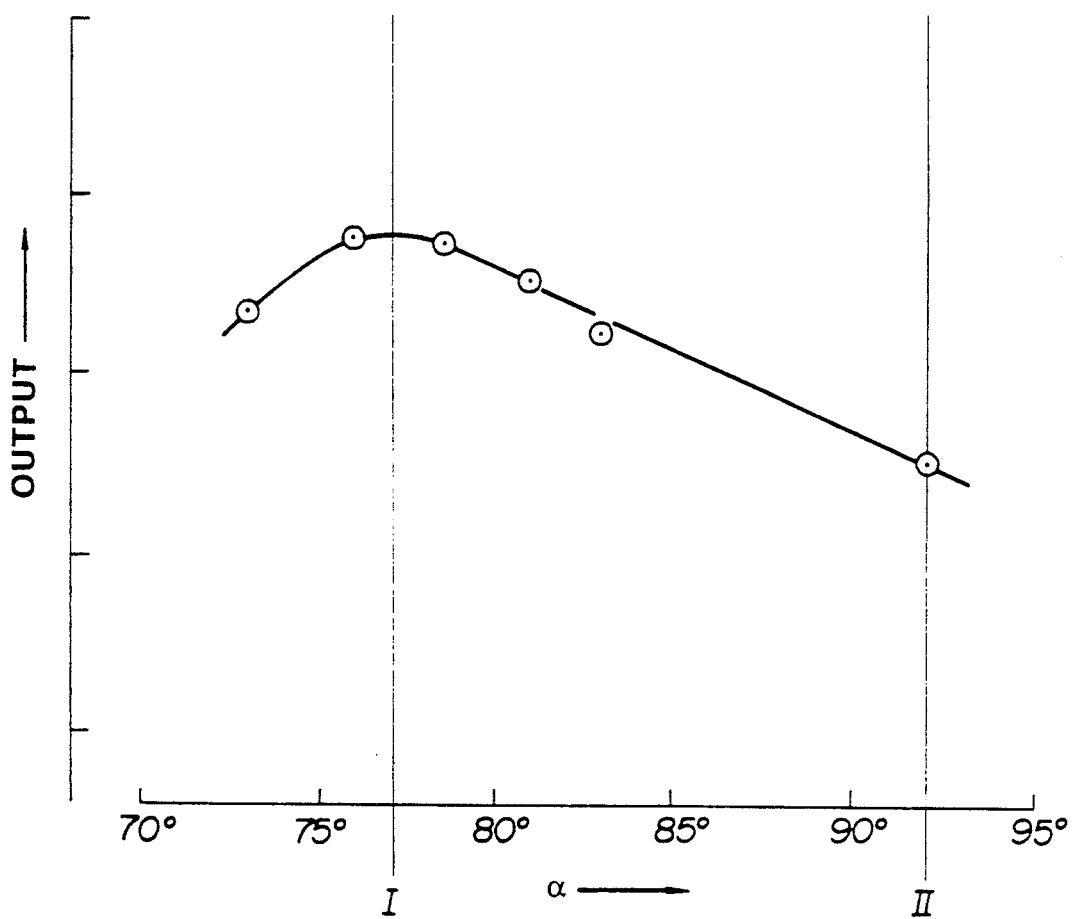
FIG. 8 is a graph which shows the effect of the magnitude of the angle at which the first flame splitting occurs, on the output of the engine.

By way of example, if the angle QPQ (viz., $\alpha$) is set at 77° with $\phi = 33°$, if the leading edge island 108 is moved from position I to position II in the manner shown in FIG. 3, then the valve of $\alpha$ changes to $\alpha = 92°$. As will be appreciated from FIG. 8 the amount of power which is produced, reduces notably.

The reason for this is deemed to be the reduction in the swirl intensity in the second and third dispersion zones which reduces the efficiency with which the air therein is used.

Figure 6:
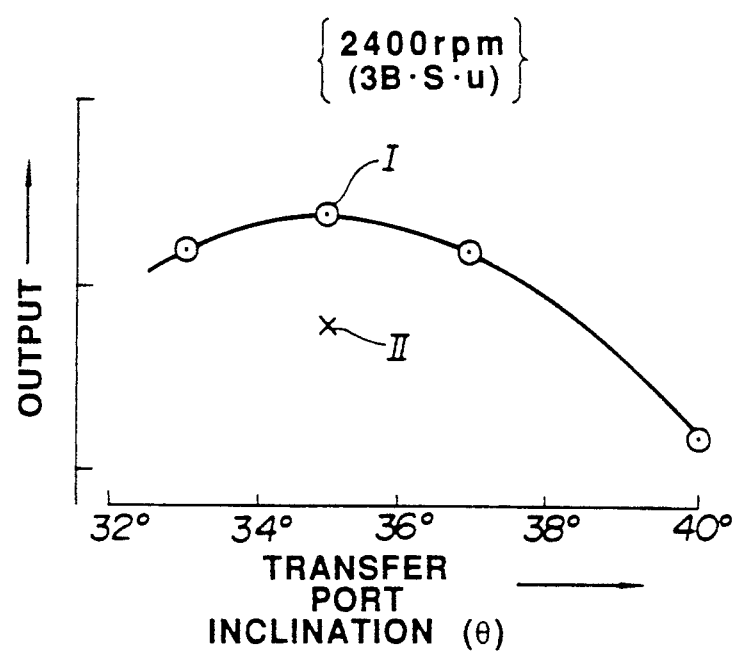
FIG. 6 is a graph which shows the effect of transfer port angle on the output of the engine at fixed engine speed and smoke levels.
Figure 7:
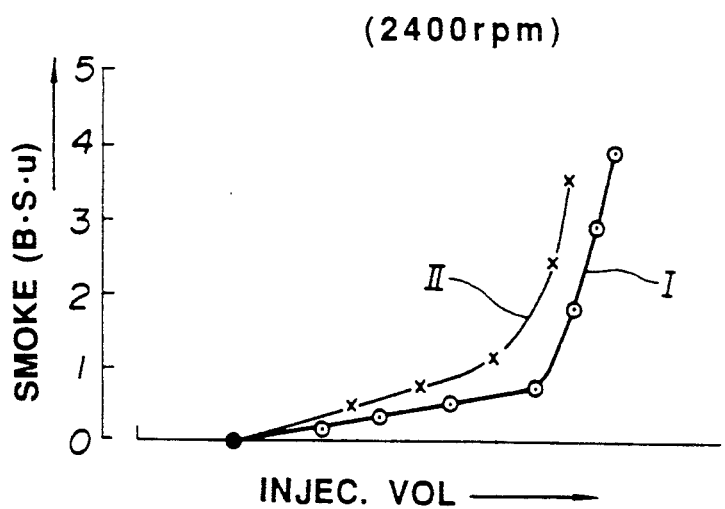
FIG. 7 is a graph which shows the effect of injection volume on the amount of smoke which is produced.

From FIGS. 6 and 7 the effect on engine power output and smoke formation by the value of $\phi$ and the amount of fuel which is injected can be observed.

From this data it has been determined that the $(\alpha/2)\pm2°$ is required to produce the desired combustion characteristics.

In this connection, it is required to set the shape and position of the island 108 carefully in the main combustion chamber with a view of achieving the required gas flow and air usage characteristics.

Figure 9:
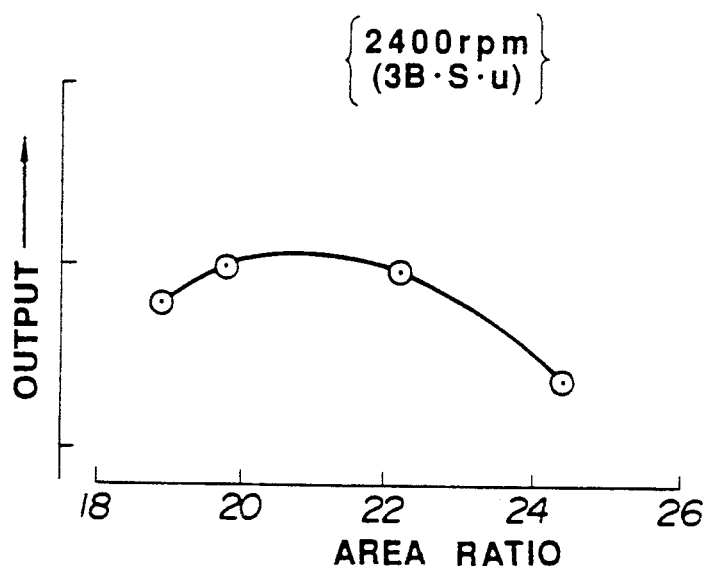
FIG. 9 is a graph which shows the relationship between the output of the engine and the area ratio of two essentially circular flame dispersing recesses.
Figure 10:
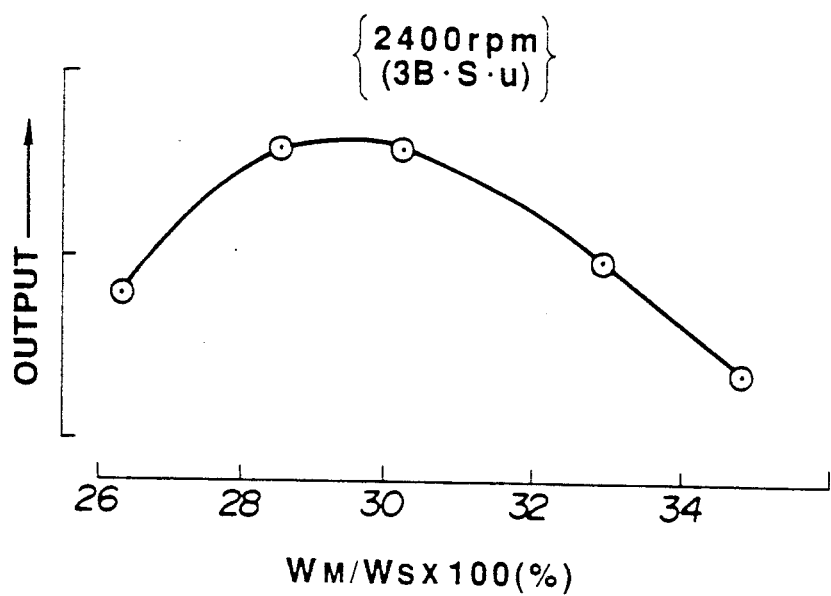
FIG. 10 is a graph which shows the relationship between the engine output and the ratio Ww/Ws (the width of the first flame dispersing island-like projection and the width of the cove-like bay in the mouth of which the island-like projection is disposed.

A further consideration comes in the setting of the ratio of the area of the first dispersion zone to the area of the second and third zones. As shown in FIG. 9, it has been discovered in connection with the present invention that if the area of the first dispersion zone is set in the range of 19.5-22.5% desirable combustion characteristics and engine output are achieved.

It should be noted that, in this instance the areas of the second and third dispersion zones are determined by extrapolating the curved wall portions 101D and 101E inwardly toward the island 108 as indicated by the broken lines "ex".

When the flaming gases are ejected from the swirl chamber by way of the transfer port 106 into the main combustion chamber, the piston is approximately at its TDC position. As a result, the gases are delivered into the first flame dispersion zone. In the event that the area of this zone is set too small, while the piston is at or close to its TDC position, the pressure and temperature in this zone elevate to the point which prevents the cooler air from entering the same. Accordingly, combustion in the main combustion chamber tends to be delayed.

On the other hand, if the area of the first dispersion zone is too large, the velocity of the gases which flow into the second and third dispersion zones is insufficient to induce the require swirl intensity. Accordingly, combustion in these latter zones is slowed and the efficiency with which air is used is reduced.

Further parameters which are deemed important to the operation of the instant invention are the width Wt of the transfer port 106, the width Wm of the island, and the width Ws defined between the nose-like guide portions 101A and 101B. As changing the dimensions of the island 108 is at to induce a number of other changes, the ratio of Wm/Ws is varied mainly by changing Ws. By holding the above mentioned area ratio constant and increasing WS by reducing the lengths of the portions 101A and 101B, it is possible to reduce the velocity of the gases which flow out of the first dispersion zone and thus reduce the swirling in the second and third ones. On the other hand, by increasing the lengths of 101A, 101B, Ws can be reduced. However, excessive reduction of Ws this can lead to throttling the communication between the dispersion zones and induce the situation wherein the gas flow up over wall 101 toward the perimeter of the piston. Under these conditions the gases tend to encounter the relatively cool bore wall and undergo quenching.

In connection with the above-mentioned facet of the invention, it is preferred that the area ratio of the first dispersion zone be held at 20% and the ratio of Wm/Ws be set between 0.275–0.315.

It is possible to set the value of Ws at about the distance by which the centers Q, Q of the second and third dispersion zones are separated.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. In a swirl chamber type diesel engine, wherein a main combustion chamber is fluidly communicated with a swirl chamber by way of a transfer port, an arrangement comprising:
    a piston, having an essentially flat crown portion and an imaginary line of symmetry which divides the circular crown into first and second semi-circular halves, said transfer port being arranged so that an extrapolation thereof falls on said line;
    means defining first and second essentially circular dispersion recesses on either side of said line and in said first and second semi-circular halves, said essentially circular dispersion recesses having first and second centers respectively;
    means defining an island-like projection, said island-like projection being located on said line;
    a V-shaped portion defined on said island-line projection, said V-shaped portion being oriented toward the periphery of the piston, an apex of said V-shaped portion being disposed on said line and arranged so that it is located on the inboard extremum of the extrapolation of the transfer port when the piston assumes a first predetermined position wherein the crank angle is in the range of 17°–21° ATDC and so that it is located on the outboard extremum of the extrapolation when the piston has descended from the first predetermined position to a second predetermined position wherein the crank angle is in the range of 33°–35° ATDC, the inboard and outboard extremums intersecting the crown of the piston at a predetermined angle $\phi$, said inboard extremum intersecting the crown of said piston at a point P when the piston assumes its TDC position, said point being located with respect to said first and second essentially circular recesses so that an angle defined between straight lines joining said point P to said first and second centers respectively, does not differ from a predetermined angle by more than $\pm 2°$.

2. In an internal combustion engine, a combination comprising:
    a piston reciprocatively disposed in a bore to define a variable volume combustion chamber; and
    a swirl chamber, said swirl chamber being fluidly communicated with the combustion chamber by a transfer passage,
    said piston comprising an essentially flat crown,
    a shaped cavity formed in said crown, said cavity defining first and second shaped opposed wall portions,
    a flame deflecting projection which extends from a floor of said cavity, said flame deflecting projection being arranged to be in the path of the burning gases which eject from said transfer passage during an expansion stroke of the piston when the piston is close to its TDC position, said flame deflecting projection being arranged to split the burning gases into first and second flows,
    said first and second shaped wall portions and said flame deflecting projection defining
    a first flame dispersion zone into which the burning gases from the swirl chamber are initially ejected, and
    second and third essentially circular symmetrically arranged dispersion zones,
    said first flame dispersing portion being arranged such that, when the piston is at its TDC position, essentially all of the burning gases which are ejected from the swirl chamber are received into said first flame dispersion zone and subsequently split into two rotating swirl patterns in said second and third dispersion zones,
    said first shaped wall being formed with two symmetrically arranged guide portions which extend toward said flame deflecting projection and which deflect the gases which flow from said first dispersion zone into said second and third dispersion zones, a ratio defined by the width of said flame deflecting projection taken in the direction of the guide portions divided by the distance between the guide portions being selected to be in the range of 0.275–0.315.

3. In an internal combustion engine, a combination comprising:

a piston reciprocatively disposed in a bore to define a variable volume combustion chamber; and a swirl chamber, said swirl chamber being fluidly communicated with the combustion chamber by a transfer passage, said piston comprising means defining a first flame dispersion recess in the crown of said piston into which the burning gases from the swirl chamber are initially ejected, means defining and second and third essentially circular dispersion recesses in the crown of said piston, said second and third dispersion recesses being contiguous with one another and symmetrically arranged with and contiguous with said first flame dispersing recess, said first flame dispersing recess being arranged so that when the piston is at a TDC position, essentially all of the burning gases which are ejected from the swirl chamber are received therein and split into two flows which flow into the second and third flame dispersing recesses and form circular swirl patterns therein, and an island-like projection formed at a location between said first, second and third dispersion recesses, said island-like projection defining means against which gases ejected into the first flame dispersing recess impinge and are split into the two flows and guided into said second and third dispersion recesses, said island-like projection being arranged with respect to the transfer passage so that the burning gases from the swirl chamber begin to impinge directly thereon after the piston has descended from its TDC position to one corresponding to a crank angle range of 17°–21° ATDC, thereby defining a stage wherein the flame splitting action begins to attenuate and undergoes no splitting action after the piston has descended by a second predetermined amount which falls in a crank angle range of 33°–35° ATDC.

* * * * *